Patented Aug. 12, 1924.

1,504,549

UNITED STATES PATENT OFFICE.

FRANCIS X. GOVERS, OF NEW YORK, N. Y.

METHOD OF PREPARING SILICEOUS MATERIAL.

No Drawing.   Application filed August 7, 1923.   Serial No. 656,298.

*To all whom it may concern:*

Be it known that I, FRANCIS X. GOVERS, a citizen of the United States, residing at New York city, in the county of New York, State of New York, have invented certain new and useful Improvements in Methods of Preparing Siliceous Material; and I do hereby declare the following to be a full, clear, and exact description of the invention, such as will enable others skilled in the art to which it appertains to make and use the same.

This invention relates to the preparation of siliceous material having marked properties of adsorption. In addition to its valuable properties as an adsorptive agent this siliceous material is useful as a catalyst and a carrier for catalytic materials and for other purposes.

In his early work Graham introduced the names "sol" to distinguished colloidal solutions and "gel" to designate the precipitated or coagulated colloid. The word "gel" is used hereinafter in the sense indicated.

The methods of preparing colloidal silicic acid are and have been well known for many years and the literature contains disclosures of the comparative effect of different concentrations of the various precipitating or coagulating agents upon solutions of sodium silicate with respect to the production of a gel. A common method of preparing silicic acid includes the addition of a dilute solution of hydrochloric acid to a dilute solution of sodium silicate which is stirred thoroughly during the addition of the acid to ensure the proper mingling of the reacting materials. The colloidal silicic acid, according to the concentration and temperature of the solutions, will be precipitated immediately or form an opalescent mixture. This mixture, after a time interval, which is also affected by the concentration and temperature, will set as a firm jelly-like mass or gel.

The gel contains colloidal silicic acid, the salts formed by the reaction and any impurities which were present in the sodium silicate and acid. It is desirable that the salts and impurities be removed and it has been the practice heretofore to break up the gel and to wash it until it is free from adhering and retained salts and impurities. In fact it has been claimed that the washing must be carried out immediately after the gel is formed to effect substantially complete removal of the contaminating substances. After washing the gel is dried and in some cases ground to a definite degree of fineness before use.

The difficulties attending the washing of gelatinous colloids, whether precipitated or coagulated, are manifold and sufficiently well known to all chemists who have had occasion to attempt the washing of such materials. The operation is exceedingly slow and tedious and complete washing can be effected only by prolonged treatment. Moreover the washing of gelatinous colloids is attended by considerable losses of material and is therefore inefficient and wasteful.

It is the object of the present invention to avoid the difficulties of preparing silicic acid in the manner heretofore employed by eliminating washing of the material while it is in a gelatinous colloidal condition.

Further objects and advantages of the invention will be apparent as it is better understood by reference to the following specification in which the preferred embodiment of my invention is described.

In carrying out the invention I prepare a precipitated or coagulated silicic acid in the well known manner, for example, by adding a solution of hydrochloric acid to a solution of sodium silicate, mingling the solutions thoroughly during the addition of the acid. The strength of the solutions may vary, depending upon the time which is to elapse before the gel is formed. For example, a solution of sodium silicate having a density of from 1.06 to 1.12 may be treated with an equal volume of hydrochloric acid varying in strength from 0.55 normal to 4.0 normal, at temperature varying from 0° to 100° C. The figures merely illustrate the wide range of possible practice. For practical purposes sodium silicate of 1.12 density and hydrochloric acid at 1.2 normal will produce a gel which sets in from 2 to 3 hours. Other acids may be used and my invention, which does not involve the details of forming the gel, is not limited to the preparation thereof according to any particular method.

As above indicated the gel contains undesirable impurities and I have discovered that the removal of these impurities is facilitated by first drying the gel until it has substantially lost its power to return to its prior gelatinous colloidal form in contact with water. In other words, the gel is dried until it assumes a structural form from which it will not revert. This does not necessarily involve complete drying or removal of all moisture present. The change in the material is one, however, which is readily determined by test and the drying is conducted accordingly.

This drying may be effected in any suitable manner. For example, the gel is broken up by an arm rotating in a perforated steel shell which permits material of the desired size to escape therefrom. The broken gel is delivered to trays which may be formed by stretching muslin over wooden frames and the trays are placed in an ordinary tunnel dryer.

When the material has dried to the extent necessary to avoid reversion to the prior gelatinous colloidal form it is washed by the addition of water. This may be accomplished in a variety of ways well known in the art. Thus the material may be placed in a filter-press through which the water is forced. After the impurities have been removed the product is again dried and is ready for shipment. It may be ground to any size required for the particular purpose for which it is to be utilized. The product has all of the desirable characteristics of a dried gel of silicic acid.

The washing is accomplished with much more efficiency after the material has been dried than is possible in washing the gelatinous colloidal material. Losses are reduced and the time and quantity of water required for complete washing are materially lessened.

Various changes may be made in the details of operation as hereinbefore indicated without departing from the invention or sacrificing any of the advantages thereof.

I claim:—

1. The method of preparing silicic acid, which comprises forming a jelly-like mass of colloidal silicic acid, drying the mass with the impurities therein until it will no longer revert to its prior gelatinous colloidal form in the presence of water, washing the dried material and again drying it.

2. The method of preparing silicic acid, which comprises forming a jelly-like mass of colloidal silicic acid, by the reaction of sodium silicate with an acid, drying the mass with the salts formed by the reaction and the impurities therein until it will no longer revert to its prior gelatinous colloidal form in the presence of water, washing the salts and impurities from the material and again drying it.

In testimony whereof I affix my signature.

FRANCIS X. GOVERS.